United States Patent

Hayashi et al.

[11] Patent Number: 6,054,201
[45] Date of Patent: *Apr. 25, 2000

[54] MAGNETIC RECORDING MEDIUM

[75] Inventors: Kazuyuki Hayashi; Keisuke Iwasaki; Hiroko Morii; Yasuyuki Tanaka, all of Hiroshima, Japan

[73] Assignee: Toda Kogyo Corporation, Hiroshima-ken, Japan

[ * ] Notice: This patent is subject to a terminal disclaimer.

[21] Appl. No.: 09/030,962

[22] Filed: Feb. 26, 1998

[30] Foreign Application Priority Data

Feb. 28, 1997 [JP] Japan ................................. 9-062020

[51] Int. Cl.⁷ ........................................... G11B 5/738
[52] U.S. Cl. ................... 428/141; 428/329; 428/694 BS; 428/900
[58] Field of Search .................... 428/141, 329, 428/694 BS, 900; 252/521.2; 106/456

[56] References Cited

U.S. PATENT DOCUMENTS

| 4,082,905 | 4/1978 | Stephan et al. | 428/538 |
| 4,840,677 | 6/1989 | Ostertag | 106/456 |
| 4,898,619 | 2/1990 | Clifford et al. | 106/459 |
| 5,587,232 | 12/1996 | Hayashi et al. | 428/323 |
| 5,604,015 | 2/1997 | Hayashi et al. | 428/144 |
| 5,750,250 | 5/1998 | Hayashi et al. | 428/328 |

FOREIGN PATENT DOCUMENTS

| 0 582 472 A1 | 2/1994 | European Pat. Off. . |
| 0 732 688 | 9/1996 | European Pat. Off. . |

*Primary Examiner*—Stevan A. Resan
*Attorney, Agent, or Firm*—Nixon & Vanderhye

[57] ABSTRACT

The present invention relates to a magnetic recording medium comprising: a non-magnetic substrate; a non-magnetic undercoat layer formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and a binder resin,; and a magnetic recording layer formed on said non-magnetic undercoat layer, said magnetic recording layer comprising magnetic particles containing iron as a main ingredient and a binder resin. The magnetic recording medium has small light transmittance, smooth surface, high strength and high durability.

9 Claims, No Drawings

MAGNETIC RECORDING MEDIUM

BACKGROUND OF THE INVENTION

The present invention relates to a magnetic recording medium. More particularly, the present invention relates to a magnetic recording medium which uses the hematite particles as non-magnetic particles for a non-magnetic undercoat layer, and which has small light transmittance, smooth surface, high strength and high durability.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic recording layer in order to improve these properties of a magnetic recording medium.

The enhancement of the properties of magnetic particles will first be described.

The properties which magnetic particles are required to have in order to satisfy the above-described demands on a magnetic recording medium, are a high coercive force and a large saturation magnetization.

As magnetic particles suitable for high-output and high-density recording, acicular magnetic particles containing as a main ingredient which are obtained by heat-treating acicular goethite particles or acicular hematite particles in a reducing gas are widely known.

A reduction in the thickness of a magnetic recording layer will now be described. Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982, " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness . . . ".

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of a non-magnetic substrate such as the base film must also be smooth. This fact is described on pages 180 and 181 of *Materials for Synthetic Technoloqy—Causes of Friction and Abrasion of Magnetic Tape and Head Running System and Measures for Solving the Problem* (hereinunder referred to as "*Materials for Synthetic Technology*" (1987), published by the Publishing Department of Technology Information Center, " . . . the surface roughness of a hardened magnetic layer depends on the surface roughness of the substrate (back surface roughness) so largely as to be approximately proportional, . . . , since the magnetic layer is formed on the substrate, the more smooth the surface of the substrate is, the more uniform and larger head output is obtained and the more the S/N ratio is improved."

Secondly, there has been caused a problem in the strength of a non-magnetic substrate such as a base film with a tendency of the reduction in the thickness of the non-magnetic substrate in response to the demand for a thinner magnetic layer. This fact is described, for example, on page 77 of the above-described *Development of Magnetic Materials and Technique for High Dispersion of Magnetic Powder*, " . . . Higher recording density is a large problem assigned the present magnetic tape. This is important in order to shorten the length of the tape so as to miniaturize the size of a cassette and to enable long-time recording. For this purpose, it is necessary to reduce the thickness of a substrate . . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded. . . . "

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black or the like is added to the magnetic recording layer. It is, therefore, essential to add carbon black or the like to a magnetic recording layer in the present video tapes.

However, addition of a large amount of non-magnetic particles such as carbon black impairs not only the enhancement of the recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black which are added to a magnetic recording layer.

It is, therefore, strongly demanded that the light transmittance of a magnetic recording layer should be small even if the carbon black or the like which is added to the magnetic recording layer is reduced to a small amount. From this point of view, improvements in the substrate are now in strong demand.

There is no end to requirements for a higher performance in recent magnetic recording media. Since the above-described reduction in the thickness of a magnetic recording layer and a non-magnetic substrate lowers the durability of the surface of the magnetic recording layer and the magnetic recording medium, an improvement of the durability of the surface of the magnetic recording layer and the magnetic recording medium is in strong demand.

This fact is described in Japanese Patent Application Laid-Open (KOKAI) No. 5-298679, " . . . With the recent development in magnetic recording, a high picture quality and a high sound quality have been required more and more in recording. The signal recording property is, therefore, improved. Especially, finer and higher-density ferromagnetic particles have come to be used. It is further required to make the surface of a magnetic tape smooth so as to reduce noise and raise the C/N. . . . However, the coefficient of friction between the magnetic layer and an apparatus during the travel of the magnetic tape increases, so that there is a tendency of the magnetic layer of the magnetic recording medium being damaged or exfoliated even in a short time. Especially, in a video tape, since the magnetic recording medium travels at a high speed in contact with the video head, the ferromagnetic particles are apt to be dropped from the magnetic layer, thereby causing clogging on the magnetic head. Therefore, an improvement in the running stability of the magnetic layer of a magnetic recording medium is expected . . . . "

Various efforts have been made to improve the base for a magnetic recording layer with a demand for a thinner magnetic recording layer and a thinner non-magnetic substrate. A magnetic recording medium having at least one undercoat layer (hereinunder referred to "non-magnetic undercoat layer") comprising a binder resin and non-magnetic iron-based oxide particles such as hematite particles which are dispersed therein, on a non-magnetic substrate such as a base film has been proposed and put to practical use (Japanese Patent Publication (KOKOKU) No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), etc.)

For example, Japanese Patent Application Laid-Open (KOKAI) No. 5-182177 (1993) discloses a magnetic recording medium comprising: a non-magnetic substrate; a non-magnetic undercoat layer formed on the non-magnetic substrate and produced by dispersing inorganic particles in a binder resin; and a magnetic layer formed on the non-magnetic undercoat layer and produced by dispersing ferromagnetic particles in a binder resin while the non-magnetic undercoat layer is wet; wherein the magnetic layer has a thickness of not more than 1.0 $\mu$m in a dried state, the non-magnetic undercoat layer contains non-magnetic inorganic particles with surface layers coated with an inorganic oxide, the inorganic oxide coating the surfaces of the non-magnetic inorganic particles contained in the non-magnetic undercoat layer is at least one selected from the group consisting of $Al_2O_3$, $SiO_2$ and $ZrO_2$, and the amount of the inorganic oxide coating the non-magnetic inorganic particles is 1 to 21 wt % in the case of $Al_2O_3$, 0.04 to 20 wt % in the case of $SiO_2$, and 0.05 to 15 wt % in the case of $ZrO_2$, base on the total weigh of the non-magnetic inorganic particles.

Japanese Patent Application Laid-Open (KOKAI) No. 6-60362 (1994) discloses a non-magnetic undercoat layer for a magnetic recording medium formed on a non-magnetic substrate, comprising a coating composition containing non-magnetic particles and a binder resin; wherein the non-magnetic particles are non-magnetic particles constituted by acicular $\alpha$-$Fe_2O_3$ particles coated with an Al compound, and the non-magnetic particles constituted by acicular $\alpha$-$Fe_2O_3$ particles coated with an Al compound have an average major axial diameter of 0.05 to 0.25 $\mu$m, an average minor axial diameter of 0.010 to 0.035 $\mu$m, a particle size distribution of not more than 1.40 in geometrical standard deviation, and an aspect ratio (major axial diameter/minor axial diameter) of 2 to 20.

However, the above-described non-magnetic particles are not particles which contain aluminum substantially uniformly from the central portions to the surfaces of the particles but particles which have an aluminum compound on the surfaces thereof.

With reduction of the thickness of not only the magnetic recording layer but also the non-magnetic substrate, a magnetic recording medium which has small light transmittance, high strength, smooth surface and higher durability, is now in the strongest demand, but no such magnetic recording medium which sufficiently satisfies these conditions have ever been obtained.

The above-described magnetic recording media composed of a non-magnetic substrate and a non-magnetic undercoat layer produced by dispersing non-magnetic particles in a binder resin and formed on a non-magnetic substrate, have a small light transmittance, a smooth surface and a high strength, but the durability thereof is inconveniently poor.

This fact is described in Japanese Patent Application Laid-Open (KOKAI) No. 5-182177 (1993), " . . . Although the problem of surface roughness is solved by providing a magnetic layer as an upper layer after forming a thick non-magnetic undercoat layer on the surface of a substrate, the problem of the abrasion of a head and the problem of durability are not solved and still remain. This is considered to be caused because a thermoset resin is ordinarily used as a binder of the undercoat layer so that the magnetic layer is brought into contact with a head or other members without any cushioning owing to the hardened undercoat layer, and a magnetic recording medium having such an undercoat layer has a considerably poor flexibility.

Also, the demand for the enhancement of the surface smoothness in a magnetic recording medium has become increasingly stronger, and the thinner magnetic recording layer, the smoother surface is strongly demanded.

As a result of studies undertaken by the present inventors so as to solve the above-described problems, it has been found that by using specific acicular hematite particles as non-magnetic particles for a non-magnetic undercoat layer of a magnetic recording medium and magnetic particles containing as a main ingredient (hereinafter refer to as "magnetic iron-based metal particles") as the magnetic particles for a magnetic recording layer of a magnetic recording medium, the obtained magnetic recording medium has small light transmittance, smooth surface, high strength and high durability. The present invention has been achieved on the basis of this finding.

SUMMARY OF THE INVENTION

It is an object of the present invention to provide a magnetic recording medium which has smaller light transmittance, higher strength, smoother surface, and higher durability.

To accomplish the aims, in a first aspect of the present invention, there are provided a magnetic recording medium comprising:

a non-magnetic substrate;

a non-magnetic undercoat layer formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and a binder resin; and a magnetic recording layer formed on said non-magnetic undercoat layer, said magnetic recording layer comprising magnetic particles containing iron as a main ingredient and a binder resin.

In a second aspect of the present invention, there is provided a magnetic recording medium comprising:

a non-magnetic substrate;

a non-magnetic undercoat layer formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and having a coating comprising at least one selected from the group consisting of a hydroxide of aluminum, an oxide of aluminum, a hydroxide of silicon and an oxide of silicon, which is coated on the surfaces of said acicular hematite particles, and a binder resin; and a magnetic recording layer formed on said non-magnetic undercoat layer, said magnetic recording layer comprising magnetic particles containing iron as a main ingredient and a binder resin.

In a third aspect of the present invention, there is provided a non-magnetic undercoat layer for a magnetic recording medium having a magnetic recording layer containing magnetic particles containing iron as a main ingredient, said non-magnetic undercoat layer to be formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and a binder resin.

In a fourth aspect of the present invention, there is provided a magnetic recording medium comprising:

a non-magnetic substrate;

a non-magnetic undercoat layer formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and having an average major axial diameter of not more than 0.3 $\mu$m, an average minor axial diameter of 0.0025 to 0.15 $\mu$m and an aspect ratio of not less than 2:1, and a binder resin; and a magnetic recording layer formed on said non-magnetic undercoat layer, said magnetic recording layer comprising magnetic particles containing iron as a main ingredient and a binder resin.

In a fifth aspect of the present invention, there is provided a magnetic recording medium comprising:

a non-magnetic substrate;

a non-magnetic undercoat layer formed on said non-magnetic substrate, said undercoat layer comprising a binder resin and non-magnetic acicular hematite particles containing 0.05 to 50% by weight of aluminum uniformly within the particles, calculated as Al, based on the total weight of the non-magnetic particles, having an average major axial diameter of not more than 0.3 $\mu$m, an average minor axial diameter of 0.0025 to 0.15 $\mu$m and an aspect ratio of not less than 2:1, and having a coating comprising at least one selected from the group consisting of a hydroxide of aluminum, an oxide of aluminum, a hydroxide of silicon and an oxide of silicon, which is coated on the surfaces of said acicular hematite particles; and a magnetic recording layer formed on said non-magnetic undercoat layer, said magnetic recording layer comprising magnetic particles containing iron as a main ingredient and a binder resin.

In a sixth aspect of the present invention, there are provided a magnetic recording medium comprising:

a non-magnetic substrate;

a non-magnetic undercoat layer formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and a binder resin; and a magnetic recording layer formed on said non-magnetic undercoat layer, said magnetic recording layer comprising magnetic particles containing iron as a main ingredient containing 0.05 to 10% by weight of aluminum, calculated as Al, based on the total weight of the magnetic particles and a binder resin.

In a seventh aspect of the present invention, there is provided a magnetic recording medium comprising:

a non-magnetic substrate;

a non-magnetic undercoat layer formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and having a coating comprising at least one selected from the group consisting of a hydroxide of aluminum, an oxide of aluminum, a hydroxide of silicon and an oxide of silicon, which is coated on the surfaces of said acicular hematite particles, and a binder resin; and a magnetic recording layer formed on said non-magnetic undercoat layer, said magnetic recording layer comprising magnetic particles containing iron as a main ingredient containing 0.05 to 10% by weight of aluminum, calculated as Al, based on the total weight of the magnetic particles and a binder resin.

In an eighth aspect of the present invention, there is provided a non-magnetic undercoat layer for a magnetic recording medium having a magnetic recording layer containing magnetic particles containing iron as a main ingredient containing 0.05 to 10% by weight of aluminum, calculated as Al, based on the total weight of the magnetic particles, said non-magnetic undercoat layer to be formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and a binder resin.

In a ninth aspect of the present invention, there is provided a magnetic recording medium comprising:

a non-magnetic substrate;

a non-magnetic undercoat layer formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and having an average major axial diameter of not more than 0.3 $\mu$m, an average minor axial diameter of 0.0025 to 0.15 $\mu$m and an aspect ratio of not less than 2:1, and a binder resin; and a magnetic recording layer formed on said non-magnetic undercoat layer, said magnetic recording layer comprising magnetic particles containing iron as a main ingredient containing 0.05 to 10% by weight of aluminum, calculated as Al, based on the total weight of the magnetic particles and a binder resin.

In a tenth aspect of the present invention, there is provided a magnetic recording medium comprising:

a non-magnetic substrate;

a non-magnetic undercoat layer formed on said non-magnetic substrate, said undercoat layer comprising a binder resin and non-magnetic acicular hematite particles containing 0.05 to 50% by weight of aluminum uniformly within the particles, calculated as Al, based on the total weight of the non-magnetic particles, having an average major axial diameter of not more than 0.3 µm, an average minor axial diameter of 0.0025 to 0.15 µm and an aspect ratio of not less than 2:1, and having a coating comprising at least one selected from the group consisting of a hydroxide of aluminum, an oxide of aluminum, a hydroxide of silicon and an oxide of silicon, which is coated on the surfaces of said acicular hematite particles; and a magnetic recording layer formed on said non-magnetic undercoat layer, said magnetic recording layer comprising magnetic particles containing iron as a main ingredient containing 0.05 to 10% by weight of aluminum, calculated as Al, based on the total weight of the magnetic particles and a binder resin.

DETAILED DESCRIPTION OF THE INVENTION

A magnetic recording medium according to the present invention will now be explained.

The magnetic medium of according to the present invention comprises a non-magnetic substrate, a non-magnetic undercoat layer and a magnetic recording layer, in which the non-magnetic undercoat layer is sandwiched between the non-magnetic substrate and the magnetic recording layer.

The non-magnetic undercoat layer in the present invention is produced by forming a coating film on the non-magnetic substrate and drying the coating film. The coating film is formed by applying a non-magnetic coating composition which contains acicular hematite particles, a binder resin and a solvent, to the surface of the non-magnetic substrate.

As the non-magnetic substrate, the following materials which are at present generally used for the production of a magnetic recording medium are usable: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic substrate varies depending upon the material, but it is ordinarily about 1.0 to 300 µm, preferably 2.0 to 200 µm. In the case of a magnetic disc, polyethylene terephthalate is ordinarily used as the non-magnetic substrate. The thickness thereof is ordinarily 50 to 300 µm, preferably 60 to 200 µm. In the case of a magnetic tape, when polyethylene terephthalate is used as the non-magnetic substrate, the thickness thereof is ordinarily 3 to 100 µm, preferably 4 to 20 µm. When polyethylene naphthalate is used, the thickness thereof is ordinarily 3 to 50 µm, preferably 4 to 20 µm. When polyamide is used, the thickness thereof is ordinarily 2 to 10 µm, preferably 3 to 7 µm.

The thickness of the undercoat layer obtained by coating the non-magnetic substrate with the non-magnetic coating composition and drying the coating film, is ordinarily 0.2 to 10.0 µm, preferably 0.5 to 5.0 µm. If the thickness is less than 0.2 µm, not only it is impossible to ameliorate the surface roughness of the base film but also the strength is insufficient.

As the binder resin in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —SO$_3$M, —OPO$_2$M$_2$ and —NH$_2$, wherein M represents H, Na or K. With the consideration of the dispersibility of the particles, a binder resin containing a functional group —COOH or —SO$_3$M is preferable.

The mixing ratio of the non-magnetic particles to the binder resin in the non-magnetic undercoat layer is ordinarily 5 to 2000 parts by weight, preferably 100 to 1000 parts by weight based on 100 parts by weight of the binder resin.

It is possible to add a lubricant, a polishing agent, an antistatic agent, etc. which are generally used for the production of a magnetic recording medium to the non-magnetic undercoat layer.

The gloss of the coated film of the non-magnetic undercoat layer containing acicular hematite particles according to the present invention is ordinarily 170 to 280%, preferably 180 to 280%, more preferably 185 to 280%, even more preferably 190 to 280% and the surface roughness Ra thereof is ordinarily 1.0 to 15.0 nm, preferably 1.0 to 13.0 nm, more preferably 2.0 to 12.0 nm, even more preferably 2.0 to 10.0 nm. The Young's modulus (relative value to a commercially available video tape: AV T-120, produced by Victor Company of Japan, Limited) thereof is ordinarily 125 to 150, preferably 127 to 150, more preferably 130 to 150.

Acicular hematite particles as non-magnetic particles used in the present invention will now be described.

The acicular hematite particles used in the present invention contain usually 0.05 to 50 wt %, preferably 0.1 to 30 wt %, more preferably 0.5 to 20 wt % of aluminum approximately uniformly within the particles (calculated as Al) based on the total weight of the non-magnetic acicular hematite particles.

When the aluminum content within the acicular hematite particles is less than 0.05 wt % (calculated as Al), a magnetic recording medium having a non-magnetic undercoat layer containing such acicular hematite particles does not have a sufficient durability. If the aluminum content exceeds 50 wt %, although a magnetic recording medium having the non-magnetic undercoat layer containing such acicular hematite particles has a sufficient durability, the durability-improving effect becomes saturated, so that it is meaningless to add aluminum more than necessary.

The acicular hematite particles used in the present invention have an aspect ratio (average major axial diameter/average minor axial diameter, hereinunder referred to merely as "aspect ratio") of ordinary not less than 2:1, preferably not less than 3:1. The upper limit of the aspect ratio is ordinary 20:1, preferably 10:1 with due consideration of the dispersibility in the vehicle. The acicular particles here may have not only an acicular shape but also a spindle shape, a rice-ball shape or the like. If the aspect ratio is less than 2:1, it may be difficult to obtain a desired film strength.

The average major axial diameter of the acicular hematite particles used in the present invention is ordinarily not more than 0.3 µm, preferably 0.005 to 0.3 µm. If the average major axial diameter exceeds 0.3 µm, the particle size is so large as to sometimes impair the surface smoothness. On the other hand, if the average major axial diameter is less than 0.005 µm, dispersion in the vehicle is unfavorably apt to be difficult. With due consideration of the dispersibility in the vehicle and the surface smoothness of the coated film, the preferable average major axial diameter is 0.02 to 0.2 µm.

The average minor axial diameter of the acicular hematite particles used in the present invention is preferably 0.0025 to 0.15 µm. If the average minor axial diameter is less than 0.0025 µm, dispersion in the vehicle may be unfavorably difficult. On the other hand, if the average minor axial diameter exceeds 0.15 µm, the particle size is apt to become so large as to impair the surface smoothness. With due consideration of the dispersibility in the vehicle and the surface smoothness of the coated film, the more preferable average minor axial diameter is 0.01 to 0.10 µm.

The BET specific surface area of the acicular hematite particle used in the present invention is preferably not less than 35 $m^2/g$. If it is less than 35 $m^2/g$, the acicular hematite particles may be coarse or sintering may be sometimes caused between particles, which are apt to exert a deleterious influence on the surface smoothness of the coated film. The BET specific surface area is more preferably not less than 40 $m^2/g$, even more preferably not less than 45 $m^2/g$. The upper limit of the BET specific surface area is ordinarily 300 $m^2/g$. The upper limit is preferably 100 $m^2/g$, more preferably 80 $m^2/g$ with due consideration of the dispersibility in the vehicle.

The major axial diameter distribution of the acicular hematite particles used the present invention is preferably not more than 1.50 in geometrical standard deviation. If it exceeds 1.50, the coarse particles existent sometimes exert a deleterious influence on the surface smoothness of the coated film. The major axial diameter distribution is more preferably not more than 1.40, even more preferably not more than 1.35 in geometrical standard deviation with due consideration of the surface smoothness of the coated film. From the point of view of industrial productivity, the major axial diameter distribution of the acicular hematite particles is ordinarily 1.01 in geometrical standard deviation.

The resin adsorptivity of the acicular hematite particles used in the present invention is ordinarily not less than 65%, preferably not less than 68%, more preferably not less than 70%.

The degree of densification of the acicular hematite particles used in the present invention represented by the ratio of the specific surface area ($S_{BET}$) measured by a BET method to the specific surface area ($S_{TEM}$) calculated from the major axial diameter and the minor axial diameter which were measured from the particles in an electron micrograph, is ordinarily 0.5 to 2.5. With due consideration of the surface smoothness of the coated film and the dispersibility in the vehicle, the preferable $S_{BET}/S_{TEM}$ value is 0.7 to 2.0, more preferably 0.8 to 1.6.

The smaller the $S_{BET}/S_{TEM}$ value, the higher the degree of densification of the acicular hematite particles, but particles sometimes adhere to each other due to sintering therebetween, and the particle size increases, so that the surface smoothness of the coated film is likely to become insufficient. The larger the $S_{BET}/S_{TEM}$ value, densification cannot be said to be sufficient, so that there are sometimes many pores in the surfaces of particles and the dispersibility in the vehicle is likely to become insufficient.

The surfaces of the acicular hematite particles used in the present invention may be coated with at least one selected from the group consisting of a hydroxide of aluminum, an oxide of aluminum, a hydroxide of silicon and an oxide of silicon, if necessary. When the acicular hematite particles coated with the above-described coating material are dispersed in a vehicle, the particles have an affinity with the binder resin and it is easy to obtain a desired dispersibility.

The amount of aluminum hydroxide, aluminum oxide, silicon hydroxide or silicon oxide as the coating material is preferably 0.01 to 50 wt % (calculated as Al or $SiO_2$) based on the total weight of the particles. If it is less than 0.01 wt %, the dispersibility improving effect derived by the coating material can hardly be obtained. If the amount exceeds 50.00 wt %, the coating effect becomes saturated, so that it is meaningless to add a coating material more than necessary. From the point of view of dispersibility in the vehicle, the preferable amount of coating material is 0.05 to 20 wt % (calculated as Al or $SiO_2$) based on the total weight of the particles Various properties of the acicular hematite particles coated with a coating material used in the present invention such as aspect ratio, average major axial diameter, average minor axial diameter, BET specific surface area, major axial diameter distribution, degree of densification ($S_{BET}/S_{TEM}$) and resin adsorptivity are approximately equivalent in values to those of the acicular hematite particles used in the present invention the surfaces of which are not coated with a coating material.

The acicular hematite particles used in the present invention may be produced by the following process.

Firstly, acicular goethite particles are produced.

The acicular goethite particles are produced by an ordinary method such as (A) a method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.; (B) a method of producing spindle-shaped goethite particles by oxidizing a suspension containing $FeCO_3$ which is obtained by reacting an aqueous ferrous salt solution with an aqueous alkali carbonate solution, by passing an oxygen-containing gas thereinto after aging the suspension, if necessary; (C) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the $Fe^{2+}$ in the aqueous ferrous salt solution, to the aqueous ferrous salt solution containing the acicular goethite seed particles, and passing an oxygen-containing gas into the aqueous ferrous salt solution; and (D) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, and growing the obtained acicular seed goethite particles in an acidic or neutral region.

The acicular goethite particles containing substantially uniformly aluminum within the particles are obtained by passing the oxygen-containing gas such as air into the suspension of the iron-containing precipitates such as hydroxides of iron, iron carbonates or the like which are obtained by reacting a ferrous salt with an alkali hydroxide and/or an alkali carbonate, wherein an aluminum compound is existent in the above-mentioned suspension or aqueous solution before passing the oxygen-containing gas such as air thereinto in the process for producing the goethite particles. It is the more preferable to add an aluminum compound to the aqueous ferrous salt solution.

The acicular goethite particles obtained in this manner contain aluminum substantially uniformly from the central portions to the surfaces of the particles.

The acicular hematite particles containing aluminum substantially uniformly within the particles are obtained by heat-treating the thus-obtained goethite particles containing aluminum substantially uniformly within the particles.

The heat-treatment temperature is about 250 to 800° C. With due consideration of the degree of densification of the acicular hematite particles containing aluminum substantially uniformly within the particles, by heat-treating the goethite particles at 550 to 800° C., the high-density acicular hematite particles are obtained. As the non-magnetic acicular hematite particles used in the present invention, the high-density acicular hematite particles are preferable.

Especially, when the acicular goethite particles are heat-treated at a temperature as high as not less than 550° C., it is preferable to coat the surfaces of the acicular goethite particles with the above-described sintering preventive prior to the heat-treatment.

As the sintering preventive, sintering preventives generally used are usable. For example, phosphorus compounds such as sodium hexametaphosphate, polyphospholic acid and orthophosphoric acid; silicon compounds such as #3 water glass, sodium orthosilicate, sodium metasilicate and colloidal silica; boron compounds such as boric acid; aluminum compounds including aluminum salts such as aluminum acetate, aluminum sulfate, aluminum chloride and aluminum nitride, alkali aluminate such as sodium aluminate, alumina sol and aluminum hydroxide; and titanium compounds such as titanyl sulfate may be exemplified.

The amount of sintering preventive existent on the surfaces of the acicular hematite particles of the present invention is ordinarily not more than 10 wt %, preferably 0.05 to 10 wt % based on the total weight of the particles.

In order to coat the acicular hematite particles, an aluminum compound and/or a silicon compound is added to and mixed with an aqueous suspension under stirring which is obtained by dispersing the cake, slurry or dried particles of the acicular hematite particles into an aqueous solution. The pH value of the mixed solution is adjusted, if necessary. The acicular hematite particles thus coated with at least one selected from the group consisting of a hydroxide of aluminum, an oxide of aluminum, a hydroxide of silicon and an oxide of silicon are then filtered out, washed with water, dried and pulverized. The obtained acicular hematite particles may be further deaerated and compacted, if necessary.

As the aluminum compound for the coating, the same aluminum compounds as those described above as the sintering preventive are usable.

The amount of aluminum compound added is 0.01 to 50.00 wt % (calculated as Al) based on the weight of the acicular hematite particles to be treated. If the amount is less than 0.01 wt %, the improvement of the dispersibility in the vehicle may be insufficient. On the other hand, if the amount exceeds 50.00 wt %, the coating effect becomes saturated, so that it is meaningless to add an aluminum compound more than necessary.

As the silicon compound, the same silicon compounds as those described above as the sintering preventive are usable.

The amount of silicon compound added is 0.01 to 50.00 wt % (calculated as $SiO_2$) based on the weight of the acicular hematite particles to be treated. If the amount is less than 0.01 wt %, the improvement of the dispersibility in the vehicle may be insufficient. On the other hand, if the amount exceeds 50.00 wt %, the coating effect becomes saturated, so that it is meaningless to add an silicon compound more than necessary.

When both an aluminum compound and a silicon compound are used, the amount thereof used is preferably 0.01 to 50.00 wt % (calculated as Al and $SiO_2$) based on the weight of the acicular hematite particles to be treated.

The magnetic recording medium according to the present invention is produced by forming the non-magnetic undercoat layer formed on the non-magnetic substrate, forming a magnetic coating film on the non-magnetic undercoat layer by applying a coating composition containing magnetic iron-based metal particles, a binder resin and a solvent, and drying the coating film to obtain a magnetic recording layer.

The magnetic particles containing iron as a main ingredient, that is, magnetic iron-based metal particles used in the present invention comprises iron and iron and at least one selected from the group consisting of Co, Al, Ni, P, Si, Zn, Ti, Cu, B, Nd, La and Y. Further, the following magnetic iron-based metal particles may be exemplified.

1) Magnetic iron-based metal particles comprises iron and ordinarily 0.05 to 10 wt %, preferably 0.1 to 7 wt % of aluminum (calculated as Al) based on the weight of the magnetic iron-based metal particles.

2) Magnetic iron-based metal particles comprises iron; ordinarily 0.05 to 10 wt %, preferably 0.1 to 7 wt % of aluminum (calculated as Al) based on the weight of the magnetic iron-based metal particles; and ordinarily 0.05 to 40 wt %, preferably 1.0 to 35 wt %, more preferably 3 to 30 wt % of cobalt (calculated as Co) based on the weight of the magnetic iron-based metal particles.

3) Magnetic iron-based metal particles comprises iron; ordinarily 0.05 to 10 wt %, preferably 0.1 to 7 wt % of aluminum (calculated as Al) based on the weight of the magnetic iron-based metal particles; and ordinarily 0.05 to 10 wt %, preferably 0.1 to 7 wt % of at least one selected from the group consisting of Nd, La and Y (calculated as the corresponding element) based on the weight of the magnetic iron-based metal particles.

4) Magnetic iron-based metal particles comprises iron; ordinarily 0.05 to 10 wt %, preferably 0.1 to 7 wt % of aluminum (calculated as Al) based on the weight of the magnetic iron-based metal particles; ordinarily 0.05 to 40 wt %, preferably 1.0 to 35 wt %, more preferably 3 to 30 wt % of cobalt (calculated as Co) based on the weight of the magnetic iron-based metal particles;; and ordinarily 0.05 to 10 wt %, preferably 0.1 to 7 wt % of at least one selected from the group consisting of Nd, La and Y (calculated as the corresponding element) based on the weight of the magnetic iron-based metal particles.

5) Magnetic iron-based metal particles comprises iron; ordinarily 0.05 to 10 wt %, preferably 0.1 to 7 wt % of aluminum (calculated as Al) based on the weight of the magnetic iron-based metal particles; and ordinarily 0.05 to 10 wt %, preferably 0.1 to 7 wt % of at least one selected from the group consisting of Ni, P, Si, Zn, Ti, Cu and B (calculated as the corresponding element) based on the weight of the magnetic iron-based metal particles.

6) Magnetic iron-based metal particles comprises iron; ordinarily 0.05 to 10 wt %, preferably 0.1 to 7 wt % of aluminum (calculated as Al) based on the weight of the magnetic iron-based metal particles; ordinarily 0.05 to 40 wt %, preferably 1.0 to 35 wt %, more preferably 3 to 30 wt % of cobalt (calculated as Co) based on the weight of the magnetic iron-based metal particles; and ordinarily 0.05 to 10 wt %, preferably 0.1 to 7 wt % of at least one selected from the group consisting of Ni, P, Si, Zn, Ti, Cu and B (calculated as the corresponding element) based on the weight of the magnetic iron-based metal particles.

7) Magnetic iron-based metal particles comprises iron; ordinarily 0.05 to 10 wt %, preferably 0.1 to 7 wt % of aluminum (calculated as Al) based on the weight of the magnetic iron-based metal particles; ordinarily 0.05 to 10 wt %, preferably 0.1 to 7 wt % of at least one selected from the group consisting of Nd, La and Y (calculated as the corresponding element) based on the weight of the magnetic iron-based metal particles; and ordinarily 0.05 to 10 wt %, preferably 0.1 to 7 wt % of at least one selected from the group consisting of Ni, P, Si, Zn, Ti, Cu and B (calculated as the corresponding element) based on the weight of the magnetic iron-based metal particles.

8) Magnetic iron-based metal particles comprises iron; ordinarily 0.05 to 10 wt %, preferably 0.1 to 7 wt % of aluminum (calculated as Al) based on the weight of the magnetic iron-based metal particles; ordinarily 0.05 to 40 wt %, preferably 1.0 to 35 wt %, more preferably 3 to 30 wt % of cobalt (calculated as Co) based on the weight of the magnetic iron-based metal particles; ordinarily 0.05 to 10 wt %, preferably 0.1 to 7 wt % of at least one selected from the group consisting of Nd, La and Y (calculated as the corresponding element) based on the weight of the magnetic iron-based metal particles; and ordinarily 0.05 to 10 wt %, preferably 0.1 to 7 wt % of at least one selected from the group consisting of Ni, P, Si, Zn, Ti, Cu and B (calculated as the corresponding element) based on the weight of the magnetic iron-based metal particles.

The iron content in the particles is the balance, and is preferably 50 to 99 wt %, more preferably 60 to 95 wt % (calculated as Fe) based on the weight of the magnetic iron-based metal particles.

The magnetic iron-based metal particles comprising (i) iron and Al; (ii) iron, Al and Co, (iii) iron, Al and at least one rare-earth metal such as Nd, La and Y, or (iv) iron, Al, Co and at least one rare-earth metal such as Nd, La and Y is preferable from the point of the durability of the magnetic recording medium. Further, the magnetic iron-based metal particles comprising iron, Al and at least one rare-earth metal such as Nd, La and Y is more preferable.

With respect to the existing position of aluminum of ordinarily 0.05 to 10 wt % (calculated as Al) based on the weight of the magnetic iron-based metal particles, it may be contained only in the core and inside portions, or in the surface portion of the magnetic iron-based metal particles. Alternatively, aluminum may be approximately uniformly contained in the magnetic iron-based metal particles from the core portion to the surface. An aluminum-coating layer may be formed on the surfaces of the particles. In addition, any of these positions may be combined. In the consideration of the effect of improving the surface property of the magnetic recording layer or the durability of the magnetic recording medium, magnetic iron-based metal particles uniformly containing aluminum from the core portion to the surface and coated with an aluminum-coating layer are more preferable.

When the content of aluminum is less than 0.05 wt % (calculated as Al), the adsorption of the resin to the magnetic iron-based metal particles in the vehicle may not be said sufficient, so that it may be difficult to improve the durability of the magnetic recording layer. When the content of aluminum exceeds 10 wt %, the effect of improving the durability of the magnetic recording layer or the magnetic recording medium is observed, but the effect is saturated and it is meaningless to add aluminum more than necessary. Furthermore, the magnetic characteristics of the magnetic iron-based metal particles may be sometimes deteriorated due to an increase in the aluminum as a non-magnetic component. The existing amount of aluminum of the magnetic iron-based metal particles is preferably 0.1 to 7 % by weight (calculated as Al) based on the weight of the magnetic iron-based metal particles.

It is more preferable to produce a magnetic recording medium of the present invention using the magnetic iron-based metal particles containing Al, because the magnetic recording layer or magnetic recording medium produced is apt to have a more excellent durability. Especially, magnetic iron-based metal particles containing Al and rare-earth metal such as Nd, La and Y therein are the even more preferable.

The acicular magnetic iron-based metal particles containing aluminum within the particles are produced, as is well known, by adding an aluminum compound at an appropriate stage during the above-described process for producing acicular goethite particles to produce acicular goethite particles containing aluminum at desired positions of the particles, and reducing at a temperature of 300 to 500° C., the goethite particles or the acicular hematite particles containing aluminum at desired positions within the particles which are obtained by dehydrating the goethite particles.

The acicular magnetic iron-based metal particles coated with oxide of aluminum are produced by reducing at a temperature of 300 to 500° C., the acicular goethite particles coated with an oxide or hydroxide of aluminum, or the acicular hematite particles coated with the oxide or hydroxide of aluminum which are obtained by dehydrating the acicular goethite particles.

The acicular magnetic iron-based metal particles used in the present invention have an average major axial diameter of ordinarily 0.01 to 0.50 μm, preferably 0.03 to 0.30 μm, more preferably 0.03 to 0.25 μm, an average minor axial diameter of ordinarily 0.0007 to 0.17 μm, preferably 0.003 to 0.10 μm, and an aspect ratio of ordinarily not less than 3:1, preferably and not less than 5:1. The upper limit of the aspect ratio is ordinarily 15:1, preferably 10:1 with the consideration of the dispersibility in the vehicle. The shape of the acicular magnetic iron-based metal particles may have not only acicular but also a spindle-shape, rice-ball shape or the like.

As to the magnetic properties of the acicular magnetic iron-based metal particles used in the present invention, the coercive force is preferably 1200 to 3200 Oe, more preferably 1500 to 3200 Oe, and the saturation magnetization is ordinarily preferably 100 to 170 emu/g, more preferably 130 to 170 emu/g with the consideration of the properties such as high-density recording.

The resin adsorptivity of the acicular magnetic iron-based metal particles used in the present invention is ordinarily not less than 65%, preferably not less than 68%, more preferably not less than 70%, most preferably not less than 75%.

As the binder resin for the magnetic recording layer, the same binder resin as that used for the production of the non-magnetic undercoat layer is usable.

The thickness of the magnetic recording layer obtained by applying the film-coating composition to the non-magnetic undercoat layer and dried, is ordinarily in the range of 0.01 to 5.0 µm. If the thickness is less than 0.01 µm, uniform coating may be difficult, so that unfavorable phenomenon such as unevenness on the coating surface is observed. On the other hand, when the thickness exceeds 5.0 µm, it may be difficult to obtain desired signal recording property due to an influence of diamagnetism. The preferable thickness is in the range of 0.05 to 1.0 µm.

The mixing ratio of the acicular magnetic iron-based metal particles with the binder resin in the magnetic recording layer is ordinarily 200 to 2000 parts by weight, preferably 300 to 1500 parts by weight based on 100 parts by weight of the binder resin.

It is possible to add a lubricant, a polishing agent, an antistatic agent, etc. which are generally used for the production of a magnetic recording medium to the magnetic recording layer.

The magnetic recording medium according to the present invention has a coercive force of ordinarily 900 to 3500 Oe, preferably 1000 to 3500 Oe, more preferably 1500 to 3500 Oe; a squareness (residual magnetic flux density Br/saturation magnetic flux density Bm) of ordinarily 0.85 to 0.95, preferably 0.86 to 0.95, more preferably 0.87 to 0.95; a gloss (of the coating film) of ordinarily 180 to 300%, preferably 190 to 300%, more preferably 200 to 300%; a surface roughness Ra (of the coating film) of ordinarily not more than 14.0 nm, preferably 1.0 to 12.5 nm, more preferably 2.0 to 11.0 nm, even more preferably 2.0 to 10.0 nm, most preferably 2.0 to 9.0 nm; a Young's modulus (relative value to a commercially available video tape: AV T-120 produced by Victor Company of Japan, Limited) of ordinarily not less than 125, preferably not less than 130; and a linear adsorption coefficient (of the coating film) of ordinarily 1.10 to 2.00 $\mu m^{-1}$ preferably 1.20 to 2.00 $\mu m^{-1}$. As to the durability, the running durability is ordinarily not less than 11 minutes, preferably not less than 15 minutes, more preferably not less than 18 minutes, still more preferably not less than 20 minutes. In case using the magnetic iron-based metal particles containing Al as magnetic particles for the magnetic recording layer, the running durability is ordinarily not less than 18 minutes, preferably not less than 20 minutes, more preferably not less than 22 minutes. Also, the scratch resistance is ordinarily A or B, preferably A, when evaluated into four ranks: A (no scratch), B, C and D (great many scratches).

What is the most important in aspects of the present invention is the fact that when the high-density acicular hematite particles which contain 0.05 to 50 wt % of aluminum (calculated as Al) within the particles, and if necessary, the surfaces of which are coated with at least one selected from the group consisting of a hydroxide of aluminum, an oxide of aluminum, a hydroxide of silicon and an oxide of silicon, are used as the non-magnetic particles for a non-magnetic undercoat layer, it is possible to enhance the surface smoothness of the non-magnetic undercoat layer and strength of the substrate; and when the acicular magnetic iron-based metal particles are used as the magnetic particles for a magnetic recording layer and the magnetic recording layer is formed on the non-magnetic undercoat layer, it is possible to reduce the light transmittance of the magnetic recording layer and to produce a magnetic medium having a smooth surface, a high strength and an excellent durability.

The reason why the smooth surface of the non-magnetic undercoat layer and the strength of the substrate are enhanced is considered to be as follows. Since the binder resin adsorptivity of the non-magnetic particles in the vehicle is enhanced, as will be shown in later-described examples, the degree of adhesion of the non-magnetic particles in the non-magnetic undercoat layer or the non-magnetic undercoat layer itself to the non-magnetic substrate is enhanced.

The reason why the durability of the surface of the magnetic recording medium is enhanced is not clear yet, but it is considered that the durability thereof is due to the synergistic effect of using the acicular hematite particles containing aluminum uniformly within the particles as the non-magnetic particles, and using the acicular magnetic iron-based metal particles as the magnetic particles. More specifically, it is considered that since the resin adsorptivity of both the non-magnetic particles and the magnetic particles in the vehicles are enhanced due to the use of the above-described particles, as will be shown in later-described examples, the degree of adhesion of the non-magnetic particles in the non-magnetic undercoat layer or the non-magnetic undercoat layer itself to the non-magnetic substrate is enhanced, and the degree of adhesion of the magnetic particles in the magnetic recording layer and the magnetic recording layer itself to the non-magnetic undercoat layer is enhanced.

Especially, the magnetic medium of the present invention having a non-magnetic undercoat layer using the hematite particles of the present invention has a small light transmittance, a smooth surface, a high strength and an excellent durability. That is, the magnetic medium is preferable as a high-density magnetic medium.

Furthermore, due to the synergistic effect of using the acicular non-magnetic particles containing aluminum uniformly within the particles as the non-magnetic particles for the non-magnetic undercoat layer, and using the acicular magnetic iron-based metal particles as the magnetic particles for the magnetic recording layer, the durability is more excellent. That is, the magnetic medium is preferable as a high-density magnetic medium.

EXAMPLES

The present invention is described in more detail by Examples and Comparative Examples, but the Examples are only illustrative and, therefore, not intended to limit the scope of this invention.

Various properties of the magnetic medium according to the present invention were evaluated by the following methods.

(1) The average major axial diameter and the average minor axial diameter of the particles are expressed by the average values of 350 particles measured in the photograph obtained by magnifying an electron micrograph (×30000) by 4 times in the vertical and horizontal directions, respectively. The aspect ratio is the ratio of the average major axial diameter and the average minor axial diameter.

(2) The geometrical standard deviation (σg) of particle size distribution of the major axial diameter was obtained by the following method. The major axial diameters of the particles were measured from the magnified electron microphotograph in the above-mentioned (1). The actual major axial diameters of the particles and the number of particles were obtained from the calculation on the basis of the measured values. On logarithmico-normal probability paper, the major axial diameters were plotted at regular intervals on the abscissa-axis and the accumulative number of particles belonging to each interval of the major axial diameters was plotted by percentage on the ordinate-axis by a statistical technique. The major axial diameters corresponding to the number of particles of 50% and 84.13%, respectively, were read from the graph, and the geometrical standard deviation (σg) was measured from the following formula:

Geometrical standard deviation (σg)={major axial diameter ($\mu$m) corresponding to 84.13 % under integration sieve)}/{major axial diameter (geometrical average diameter) corresponding to 50% under integration sieve}.

The smaller the geometrical standard deviation, the more excellent the particle size distribution of the major axial diameters of the particles.

(3) The specific surface area is expressed by the value measured by a BET method.

(4) The degree of denseness of the particles is represented by $S_{BET}/S_{TEM}$ as described above. $S_{BET}$ is a specific surface area measured by the above-described BET method. $S_{TEM}$ is a value calculated from the average major axial diameter d cm and the average minor axial diameter w cm measured from the electron microphotograph described in (1) on the assumption that a particle is a rectangular parallellopiped in accordance with the following formula:

$$S_{TEM}(m^2/g) = \{(4 \cdot d \cdot w + 2w^2)/(d \cdot w^2 \cdot \rho_p)\} \times 10^{-4}$$

wherein $\rho_p$ is the true specific gravity of the hematite particles, and 5.2 g/cm$^3$ was used.

Since $S_{TEM}$ is a specific surface area of a particle having a smooth surface without any dehydration pore within or on the surface thereof, the closer $S_{BET}/S_{TEM}$ of particles is to 1, it means, the smoother surface the particles have without any dehydration pore within or in the surface thereof, in other words, the particles are high-density particles.

(5) The content of each of Al, Ti, P, Si, B and Nd was measured from fluorescent X-ray analysis.

(6) The viscosity of the coating composition was obtained by measuring the viscosity of the coating composition at 25° C. at a shear rate D of 1.92 sec$^{-1}$ by using an E type viscometer EMD-R (manufactured by Tokyo Keiki, Co., Ltd.).

(7) The resin adsorptivity of the particles represents the degree at which a resin is adsorbed to the particles. The closer to 100 the value obtained in the following manner, the better.

The resin adsorption Wa was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer resin having a sodium sulfonate group dissolved therein were charged into a 100-ml polyethylene bottle together with 120 g of 3 mm$\phi$ steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the a centrifugalization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorption Wa (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity We (mg/g) of resin content dissolved into the solvent phase in the three cycles was obtained, and the value calculated in accordance with the following formula is expressed as the resin adsorptivity T(%):

$$T(\%) = [(Wa - We)/Wa] \times 100.$$

The higher T value, the firmer the resin adsorption to the particles surfaces in the vehicle and the more favorable.

(8) The gloss of the surface of the coating film of each of the non-magnetic undercoat layer and the magnetic recording layer was measured at an angle of incidence of 45° by a glossmeter UGV-5D (manufactured by Suga Shikenki, Co., Ltd.).

(9) The surface roughness Ra is expressed by the average value of the center-line average roughness of the profile curve of the surface of the coating film by using "Surfcom-575A" (manufactured by Tokyo Seimitsu Co., Ltd.).

(10) The durability of the magnetic medium was evaluated by the following running durability and the scratch resistance.

The running durability was evaluated by the actual operating time under the conditions that the load was 200 gw and the relative speed of the head and the tape was 16 m/s by using "Media Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch
B: Few scratches
C: Many scratches
D: Great many scratches

(11) The strength of the coating film was expressed the Young's modulus obtained by "Autograph" (produced by Shimazu Seisakusho Ltd.). The Young's modulus was expressed by the ratio of the Young's modulus of the coating film to that of a commercially available video tape "AV T-120" (produce by Victor Company of Japan, Limited). The higher the relative value, the more favorable.

(12) The magnetic properties were measured under an external magnetic field of 10 kOe by "Vibration Sample Magnetometer VSM-3S-15 (manufactured by Toei Kogyo, Co., Ltd.)".

(13) The light transmittance is expressed by the linear adsorption coefficient measured by using "Photoelectric Spectrophotometer UV-2100" (manufactured by Shimazu Seisakusho, Ltd.). The linear adsorption coefficient is defined by the following formula, and the larger the value, the more difficult it is for the magnetic sheet to transmit light:

Linear adsorption coefficient ($\mu m^{-1}$)={(l n (1/t)}/FT wherein t represent a light transmittance (−) at λ=900 nm, and FT represents thickness ($\mu$m) of the coating composition of the film used for the measurement.

(14) The thickness of each of the non-magnetic substrate, the non-magnetic undercoat layer and the magnetic recording layer constituting the magnetic recording medium was measured in the following manner by using a Digital Electronic Micrometer K 351C (manufactured by Anritsu Denki Corp.)

The thickness (A) of a non-magnetic substrate was first measured. Similarly, the thickness (B) (B=the sum of the thicknesses of the non-magnetic substrate and the non-magnetic undercoat layer) of a substrate obtained by forming a non-magnetic undercoat layer on the non-magnetic substrate was measured. Furthermore, the thickness (C) (C=the sum of the thicknesses of the non-magnetic substrate, the non-magnetic undercoat layer and the magnetic recording layer) of a magnetic recording medium obtained by forming a magnetic recording layer on the non-magnetic undercoat layer was measured. The thickness of the non-magnetic undercoat layer is expressed by B–A, and the thickness of the magnetic recording layer is expressed by C–B.

Example 1

<Production of Spindle-shaped Goethite Particles>

A reaction slurry containing 1380 g of spindle-shaped goethite particles containing 3.89 wt % of aluminum (calculated as Al) uniformly within the particles (average major axial diameter: 0.141 μm, average minor axial diameter: 0.0181 μm, aspect ratio: 7.79, BET specific surface area: 146.8 m$^2$/g, geometrical standard deviation: 1.32) obtained from an aqueous ferrous sulfate solution, an aqueous aluminum sulfate solution and an aqueous sodium carbonate solution by the following method was obtained.

The suspension containing $FeCO_3$ obtained by reacting an aqueous ferrous salt solution with an aqueous alkali carbonate solution, was oxidized by passing an oxygen-containing gas thereinto after aging the suspension.

After the slurry was filtered through a press filter, pure water was passed until the electric conductivity of the filtrate became not more than 30 μs. The particles were then dried and pulverized so as to obtain spindle-shaped goethite particles containing aluminum uniformly within the particles. The resin adsorptivity measured 63.8%.

<Production of Low-density Spindle-shaped Hematite Particles>

1200 g of the thus-obtained acicular goethite particles was suspended in water so as to obtain a slurry, and the concentration of the solid content was adjusted to 8 g/liter. 150 liter of the slurry was heated to 60° C. and the pH value of the slurry was adjusted to 9.0 by adding a 0.1-N aqueous NaOH solution.

To the alkali slurry was gradually added 30.0 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles coated with a silicon oxide. The $SiO_2$ content was 0.70 wt %.

1000 g of the spindle-shaped goethite particles obtained were charged into a stainless steel rotary furnace, and heat-treated and dehydrated in the air at 330° C. for 60 minutes while rotating the furnace, to obtain low-density spindle-shaped hematite particles.

100 g of the low-density spindle-shaped hematite particles obtained were charged into 1 liter of pure water and peptized by a homomixer (produced by Tokushu-kika Kogyo, Co., Ltd.), then filtered through a Buchner filter, and pure water was passed until the electric conductivity of the filtrate became not more than 30 μs. The particles were then dried and pulverized to obtain low-density spindle-shaped hematite particles.

The thus-obtained low-density spindle-shaped hematite particles containing aluminum had an average major axial diameter of 0.108 μm, an average minor axial diameter of 0.0161 μm, and an aspect ratio of 6.70. The BET specific surface area ($S_{BET}$) was 186.5 m$^2$/g, the degree of densification ($S_{BET}/S_{TEM}$) was 3.63. The Al content was 4.27 wt %, the geometrical standard deviation was 1.35 and the resin adsorptivity was 68.8%. The hematite particles were used as the non-magnetic particles for a later-described non-magnetic undercoat layer A.

<Production of High-density Spindle-shaped Hematite Particles>

850 g of the low-density spindle-shaped hematite particles were then charged into a ceramic rotary furnace, and heat-treated in the air at 650° C. for 30 minutes while rotating the furnace so as to fill in dehydration pores.

100 g of the high-density spindle-shaped hematite particles obtained were charged into 1 liter of pure water and peptized by a homomixer (produced by Tokushu-kika Kogyo, Co., Ltd.), then filtered through a Buchner filter, and pure water was passed until the electric conductivity of the filtrate became not more than 30 μs. The particles were then dried and pulverized to obtain high-density spindle-shaped hematite particles.

The thus-obtained high-density spindle-shaped hematite particles had an average major axial diameter of 0.107 μm, an average minor axial diameter of 0.0162 μm, and an aspect ratio of 6.60. The BET specific surface area ($S_{BET}$) was 58.0 m$^2$/g, the degree of densification ($S_{BET}/S_{TEM}$) was 1.14 and the geometrical standard deviation was 1.36. The Al content was 4.30 wt % and the resin adsorptivity was 71.6%. The hematite particles were used as the non-magnetic particles for a later-described non-magnetic undercoat layer B.

<Production of a Non-magnetic Undercoat Layer>

12 g of the low-density spindle-shaped hematite particles or high-density spindle-shaped hematite particles obtained in the above were mixed with a binder resin solution (30 wt % of vinyl chloride-vinyl acetate copolymer resin having a sodium sulfonate group and 70 wt % of cyclohexanone) and cyclohexanone, and the mixture (solid content: 72 wt %) obtained was kneaded by a plast-mill for 30 minutes.

The thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene=1:1)), cyclohexanone, methyl ethyl ketone and toluene, and the obtained mixture was mixed and dispersed by a paint shaker for 6 hours to obtain a coating composition.

The thus-obtained coating composition containing hematite particles was as follows:

| | |
|---|---|
| Low-density spindle-shaped hematite particles or high-density | 100 parts by weight |

-continued

| | |
|---|---|
| spindle-shaped hematite particles | |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The viscosity of the obtained respective coating composition was 384 cP. The respective coating composition obtained was applied to a polyethylene terephthalate film of 12 μm thick to a thickness of 55 μm by an applicator, and the film was then dried, thereby forming a non-magnetic undercoat layer. The thickness of the non-magnetic undercoat layer was 3.5 μm.

The non-magnetic undercoat layer A produced from the low-density spindle-shaped hematite particles as the non-magnetic particles had a gloss of 189%, and a surface roughness Ra of 11.0 nm. The Young's modulus (relative value) of the substrate was 132.

The non-magnetic undercoat layer B produced from the high-density spindle-shaped hematite particles as the non-magnetic particles had a gloss of 215%, and a surface roughness Ra of 7.6 nm. The Young's modulus (relative value) of the substrate was 135.

Example 2

<Production of a Magnetic Recording Layer>

12 g of acicular magnetic iron-based metal particles (average major axial diameter: 0.113 μm, average minor axial diameter: 0.0185 μm, aspect ratio: 6.11:1, coercive force: 1880 Oe, saturation magnetization: 128 emu/g, geometric standard deviation: 1.36, resin adsorptivity: 75.1%) which contained 0.74 wt % of aluminum in the central portion, and 0.39 wt % of aluminum in the surface portion (calculated as Al), respectively, 1.2 g of a polishing agent (AKP-30: trade name, produced by Sumitomo Chemical Co., Ltd.), 0.36 g of carbon black (#3250B, trade name, produced by Mitsubishi Chemical Corp.), a binder resin solution (30 wt % of vinyl chloride-vinyl acetate copolymer resin having a sodium sulfonate group and 70 wt % of cyclohexanone) and cyclohexanone were mixed to obtain a mixture (solid content: 78 wt %). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic iron-based metal particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 3.0 parts by weight |
| Lubricant (myristic acid: butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer A or B to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the magnetic recording layer was 1.1 μm.

The coercive force Hc of the magnetic tape produced by forming a magnetic recording layer on the non-magnetic undercoat layer A was 1961 Oe, the squareness (Br/Bm) thereof was 0.87, the gloss thereof was 199%, the surface roughness Ra thereof was 10.0 nm, the Young's modulus (relative value) thereof was 134, the linear absorption coefficient thereof was 1.25, the running durability thereof was 23.6 minutes, and the scratch resistance thereof was A.

The coercive force Hc of the magnetic tape produced by forming a magnetic recording layer on the non-magnetic undercoat layer B was 1973 Oe, the squareness (Br/Bm) thereof was 0.88, the gloss thereof was 221%, the surface roughness Ra thereof was 7.8 nm, the Young's modulus (relative value) thereof was 135, the linear absorption coefficient thereof was 1.26, the running durability thereof was 29.6 minutes, and the scratch resistance thereof was A.

Example 3 to 8 Comparative Examples 1 to 3

<Kinds of Acicular Hematite Particles>

Acicular hematite particles containing aluminum uniformly within the particles which were different in the basic production reaction of the acicular goethite particles containing aluminum uniformly within the particles as the starting material, aluminum content, kind and amount of sintering preventive, degree of densification, presence or absence of a surface coating, kind and amount of surface coating, and resin adsorptivity were prepared.

Various properties of the acicular hematite particles A1 to A9 are shown in Tables 1 and 2.

The surfaces of the acicular non-magnetic particles were coated in the following manner except for varying the kind of non-magnetic particles, and the kind and amount of coating material.

5 liter of slurry containing the non-magnetic particles A3 and having a concentration of 98 g/liter was heated to 60° C., and 199.6 ml (equivalent to 1.1 wt % (calculated as Al) based on the acicular hematite particles) of a 1.0-N NaAlO$_2$ solution was added to the slurry, and the mixture was held for 30 minutes. Thereafter, the pH value of the resultant mixture was adjusted to 7.5 by using acetic acid. The particles were then filtered out, washed with water, dried and pulverized in the same way as in Example 1, thereby obtaining acicular hematite particles coated with a coating material.

<Production of a Non-magnetic Undercoat Layer>

Non-magnetic undercoat layers were obtained in the same was as in Example 1 by using the non-magnetic particles A1 to A9.

The main producing conditions and various properties are shown in Table 3.

Examples 9 to 22 Comparative Examples 5 to 9

<Production of a Magnetic Medium>

4 kinds of magnetic iron-based metal particles shown in Table 4 were prepared.

Magnetic media using the magnetic iron-based metal particles were produced in the same way as in Example 2 except for the kind of non-magnetic undercoat layer and the kind of acicular magnetic iron-based metal particles.

The main producing conditions and various properties are shown in Tables 5 and 6.

TABLE 1

|  | A1 | A2 | A3 |
|---|---|---|---|
| Kind of acicular non-magnetic particles Sintering preventive | Low-density hematite particles | High-density hematite particles | High-density hematite particles |
| Kind | #3 Water glass | Sodium hydrogen phosphate | Colloidal silica |
| Amount added (wt %) | $SiO_2$: 0.78 | P: 0.56 | $SiO_2$: 3.84 |

|  | A4 | A5 | A6 |
|---|---|---|---|
| Kind of acicular non-magnetic particles Sintering preventive | High-density hematite particles | High-density hematite particles | High-density hematite particles |
| Kind | Phosphoric acid | Phosphoric acid | #3 Water glass/ Phosphoric acid |
| Amount added (wt %) | P: 1.01 | P: 0.86 | $SiO_2$: 1.51 P: 1.03 |

|  | A7 | A8 | A9 |
|---|---|---|---|
| Kind of acicular non-magnetic particles Sintering preventive | Low-density hematite particles | High-density hematite particles | High-density hematite particles |
| Kind | Boric acid | titanyl sulfate | #3 Water glass/ Phosphoric acid |
| Amount added (wt %) | B: 0.32 | Ti: 3.84 | $SiO_2$: 0.26 P: 0.35 |

TABLE 2

| Kind of acicular non-magnetic particles | A1 | A2 | A3 |
|---|---|---|---|
| Average major or axial diameter ($\mu$m) | 0.095 | 0.131 | 0.151 |
| Average minor axial diameter ($\mu$m) | 0.0151 | 0.0199 | 0.0231 |
| Geometric standard deviation $\sigma g$ (−) | 1.30 | 1.32 | 1.35 |
| Aspect ratio (−) | 6.29 | 6.58 | 6.54 |
| $S_{BET}$ (m$^2$/g) | 205.0 | 49.7 | 45.3 |
| $S_{TEM}$ (m$^2$/g) | 55.0 | 41.6 | 35.8 |
| $S_{BET}/S_{TEM}$ (−) | 3.73 | 1.19 | 1.26 |
| Al content (wt %) | 3.69 | 1.03 | 0.62 |
| Surface Treatment |  |  |  |
| Kind | Hydroxides of aluminuin | — | Hydroxides of aluminum |
| Amount added (wt %) | Al: 3.25 | — | Al: 1.06 |
| Resin adsorptivity (%) | 70.1 | 72.6 | 75.6 |

| Kind of acicular non-magnetic particles | A4 | A5 | A6 |
|---|---|---|---|
| Average major axial diameter ($\mu$m) | 0.126 | 0.125 | 0.110 |
| Average minor axial diameter ($\mu$m) | 0.0200 | 0.0200 | 0.0178 |
| Geometric standard deviation $\sigma g$ (−) | 1.28 | 1.28 | 1.35 |
| Aspect ratio (−) | 6.30 | 6.25 | 6.18 |
| $S_{BET}$ (m$^2$/g) | 56.0 | 55.6 | 61.8 |
| $S_{TEM}$ (m$^2$/g) | 41.5 | 41.5 | 46.7 |
| $S_{BET/STEM}$ (−) | 1.35 | 1.34 | 1.32 |
| Al content (wt %) | 1.45 | 1.45 | 0.85 |
| Surface Treatment |  |  |  |
| Kind | Hydroxides of aluminum | Oxides of silicon | Hydroxides of aluminum/ Oxides of silicon |
| Amount added (wt %) | Al: 0.89 | $SiO_2$: 0.15 | Al: 1.51 $SiO_2$: 0.62 |
| Resin adsorptivity (%) | 80.8 | 78.9 | 80.1 |

| Kind of acicular non-magnetic particles | A7 | A8 | A9 |
|---|---|---|---|
| Average major or axial diameter ($\mu$m) | 0.215 | 0.196 | 0.323 |
| Average minor axial diameter ($\mu$m) | 0.0265 | 0.0263 | 0.0391 |
| Geometric standard deviation $\sigma g$ (−) | 1.45 | 1.39 | 1.36 |
| Aspect ratio (−) | 8.11 | 7.45 | 8.26 |
| $S_{BET}$ (m$^2$/g) | 126.0 | 40.8 | 26.5 |
| $S_{TEM}$ (m$^2$/g) | 30.8 | 31.2 | 20.9 |
| $S_{BET}/S_{TEM}$ (−) | 4.09 | 1.31 | 1.27 |
| Al content (wt %) | 0.03 | 0.01 | 0.01 |
| Surface Treatment |  |  |  |
| Kind | — | — | Hydroxides of aluminum |
| Amount added (wt %) | — | — | 0.21 |
| Resin adsorptivity (%) | 41.3 | 46.9 | 59.2 |

TABLE 3

| | Example 3 | Example 4 | Example 5 | Example 6 | Example 7 |
|---|---|---|---|---|---|
| Production of non-magnetic coating composition | | | | | |
| Kind of acicular hematite particles | A1 | A2 | A3 | A4 | A5 |
| Weight ratio of particles and resin (−) | 5.0 | 5.0 | 5.0 | 5.0 | 5.0 |
| Non-magnetic coating composition | | | | | |
| Viscosity (cP) | 5888 | 512 | 307 | 384 | 410 |
| Non-magnetic undercoat layer | | | | | |
| Thickness (μm) | 3.1 | 3.2 | 3.1 | 3.2 | 3.2 |
| Gloss (%) | 193 | 206 | 211 | 216 | 198 |
| Ra (nm) | 11.8 | 8.0 | 7.8 | 6.8 | 6.4 |
| Young's modulus (−) (relative value) | 128 | 134 | 131 | 131 | 130 |

| | Example 8 | Comp. Example 1 | Comp. Example 2 | Comp. Example 3 |
|---|---|---|---|---|
| Production of non-magnetic coating composition | | | | |
| Kind of acicular hematite particles | A6 | A7 | A8 | A9 |
| Weight ratio of particles and resin (−) | 5.0 | 5.0 | 5.0 | 5.0 |
| Non-magnetic coating composition | | | | |
| Viscosity (cP) | 768 | 2560 | 256 | 128 |
| Non-magnetic undercoat layer | | | | |
| Thickness (μm) | 3.4 | 3.3 | 3.2 | 3.0 |
| Gloss (%) | 225 | 151 | 165 | 146 |
| Ra (nm) | 5.5 | 18.9 | 16.5 | 22.8 |
| Young's modulus (−) (relative value) | 128 | 119 | 120 | 126 |

TABLE 4

| Kind of magnetic particles | magnetic iron-based alloy particles (1) | magnetic iron-based alloy particles (2) | magnetic iron-based alloy particles (3) | magnetic iron-based alloy particles (4) |
|---|---|---|---|---|
| Average major axial diameter (μm) | 0.125 | 0.119 | 0.110 | 0.118 |
| Average minor axial diameter (μm) | 0.0178 | 0.0169 | 0.0165 | 0.0186 |
| Aspect ratio (−) | 7.02 | 7.04 | 6.67 | 6.34 |
| Geometric standard deviation (−) | 1.38 | 1.36 | 1.40 | 1.36 |
| Coercive force (Oe) | 1910 | 1965 | 2166 | 1876 |
| Saturation magnetization (emu/g) | 134.8 | 131.2 | 121.6 | 127.1 |
| Content of existent Al | | | | |
| Central portion (wt %) | 1.39 | 0.21 | 1.11 | 0.01 |
| Surface layer portion (wt %) | 1.39 | 1.26 | 2.20 | 0.01 |
| Surface coating film (wt %) | 0.01 | 0.03 | 0.98 | 0.01 |
| Content of existent Nd (wt %) | 0.01 | 0.47 | 2.56 | 0.02 |
| Resin adsorptivity (%) | 78.9 | 81.3 | 85.6 | 58.0 |

TABLE 5

| | Ex. 9 | Ex. 10 | Ex. 11 | Ex. 12 |
|---|---|---|---|---|
| Magnetic recording medium using magnetic iron-based metal particles | | | | |
| Kind of non-magnetic undercoat layer | "A" in Ex. 1 | "B" in Ex. 1 | Ex. 3 | Ex. 3 |
| Kind of magnetic iron-based metal particles | (2) in Table 4 | (3) in Table 4 | (2) in Table 4 | (3) in Table 4 |
| Weight ratio of magnetic particles and resin (−) | 5.0 | 5.0 | 5.0 | 5.0 |
| Properties of magnetic recording medium | | | | |
| Thickness of magnetic layer (μm) | 1.0 | 1.1 | 0.9 | 1.1 |
| Coercive force (Oe) | 2025 | 2201 | 2005 | 2207 |
| Br/Bm (−) | 0.87 | 0.89 | 0.88 | 0.89 |
| Gloss (%) | 206 | 235 | 220 | 221 |
| Ra (nm) | 9.0 | 6.2 | 8.3 | 8.0 |
| Young's modulus (−) (relative value) | 135 | 132 | 135 | 135 |
| Linear absorption coefficient (μm$^{-1}$) | 1.21 | 1.29 | 1.33 | 1.38 |
| Durability | | | | |
| Running durability (min) | 25.9 | >30.0 | 26.6 | 28.7 |
| Scratch resistance | B | A | B | A |

| | Ex. 13 | Ex. 14 | Ex. 15 | Ex. 16 |
|---|---|---|---|---|
| Magnetic recording medium using magnetic iron-based metal particles | | | | |
| Kind of non-magnetic undercoat layer | Ex. 4 | Ex. 4 | Ex. 5 | Ex. 5 |
| Kind of magnetic iron-based metal particles | (1) in Table 4 | (2) in Table 4 | (1) in Table 4 | (3) in Table 4 |
| Weight ratio of magnetic particles and resin (−) | 5.0 | 5.0 | 5.0 | 5.0 |

TABLE 5-continued

| Properties of magnetic recording medium | | | | |
|---|---|---|---|---|
| Thickness of magnetic layer (μm) | 1.0 | 1.1 | 1.1 | 1.0 |
| Coercive force (Oe) | 1958 | 1988 | 1982 | 2215 |
| Br/Bm (–) | 0.88 | 0.89 | 0.88 | 0.89 |
| Gloss (%) | 223 | 226 | 229 | 234 |
| Ra (nm) | 7.8 | 7.6 | 7.4 | 7.0 |
| Young's modulus (–) (relative value) | 133 | 132 | 136 | 141 |
| Linear absorption coefficient (μm$^{-1}$) | 1.35 | 1.25 | 1.26 | 1.22 |
| Durability | | | | |
| Running durability (min) | >30.0 | >30.0 | >30.0 | >30.0 |
| Scratch resistance | A | A | A | A |

| | Ex. 17 | Ex. 18 | Ex. 19 | Ex. 20 |
|---|---|---|---|---|
| Magnetic recording medium using magnetic iron-based metal particles | | | | |
| Kind of non-magnetic undercoat layer | Ex. 6 | Ex. 6 | Ex. 7 | Ex. 7 |
| Kind of magnetic iron-based metal particles | (2) in Table 4 | (3) in Table 4 | Ex. 2 | (1) in Table 4 |
| Weight ratio of magnetic particles and resin (–) | 5.0 | 5.0 | 5.0 | 5.0 |
| Properties of magnetic recording medium | | | | |
| Thickness of magnetic layer (μm) | 1.0 | 1.1 | 1.1 | 1.1 |
| Coercive force (Oe) | 2089 | 2214 | 1943 | 1977 |
| Br/Bm (–) | 0.89 | 0.90 | 0.89 | 0.89 |
| Gloss (%) | 234 | 236 | 227 | 231 |
| Ra (nm) | 6.4 | 6.0 | 6.2 | 5.8 |
| Young's modulus (–) (relative value) | 132 | 140 | 136 | 138 |
| Linear absorption coefficient (μm$^{-1}$) | 1.25 | 1.25 | 1.24 | 1.21 |
| Durability | | | | |
| Running durability (min) | >30.0 | >30.0 | 28.9 | >30.0 |
| Scratch resistance | A | A | A | A |

| | Ex. 21 | Ex. 22 |
|---|---|---|
| Magnetic recording medium using magnetic iron-based metal particles | | |
| Kind of non-magnetic undercoat layer | Ex. 8 | Ex. 8 |
| Kind of magnetic iron-based metal particles | (2) in Table 4 | (3) in Table 4 |
| Weight ratio of magnetic particles and resin (–) | 5.0 | 5.0 |
| Properties of magnetic recording medium | | |
| Thickness of magnetic layer (μm) | 1.0 | 1.1 |
| Coercive force (Oe) | 2031 | 2286 |
| Br/Bm (–) | 0.90 | 0.91 |
| Gloss (%) | 236 | 242 |
| Ra (nm) | 5.9 | 5.6 |
| Young's modulus (–) (relative value) | 134 | 142 |
| Linear absorption coefficient (82 m$^{-1}$) | 1.23 | 1.20 |
| Durability | | |
| Running durability (min) | >30.0 | >30.0 |
| Scratch resistance | A | A |

TABLE 6

| | Comp. Ex. 4 | Comp. Ex. 5 | Comp. Ex. 6 | Comp. Ex. 7 |
|---|---|---|---|---|
| Magnetic recording medium using magnetic iron-based metal particles | | | | |
| Kind of non-magnetic undercoat layer | Comp. Ex. 1 | Comp. Ex. 1 | Comp. Ex. 2 | Comp. Ex. 2 |
| Kind of magnetic iron-based metal particles | (4) in Table 4 | (1) in Table 4 | (4) in Table 4 | (1) in Table 4 |
| Weight ratio of magnetic particles and resin (–) | 5.0 | 5.0 | 5.0 | 5.0 |
| Properties of magnetic recording medium | | | | |
| Thickness of magnetic layer (μm) | 1.1 | 1.2 | 1.2 | 1.1 |
| Coercive force (Oe) | 1927 | 1929 | 1936 | 1952 |
| Br/Bm (–) | 0.84 | 0.86 | 0.85 | 0.85 |
| Gloss (%) | 171 | 187 | 190 | 198 |
| Ra (nm) | 17.6 | 15.2 | 14.6 | 13.9 |
| Young's modulus (–) (relative value) | 121 | 124 | 124 | 126 |
| Linear absorption coefficient (μm$^{-1}$) | 1.21 | 1.23 | 1.11 | 1.16 |
| Durability | | | | |
| Running durability (min) | 8.2 | 12.1 | 4.1 | 10.1 |
| Scratch resistance | D | C | C | C |

| | Comp. Ex. 8 | Comp. Ex. 9 |
|---|---|---|
| Magnetic recording medium using magnetic iron-based metal particles | | |
| Kind of non-magnetic undercoat layer | Comp. Ex. 3 | Comp. Ex. 3 |
| Kind of magnetic iron-based metal particles | (4) in Table 4 | (1) in Table 4 |
| Weight ratio of magnetic particles and resin (–) | 5.0 | 5.0 |
| Properties of magnetic recording medium | | |
| Thickness of magnetic layer (μm) | 1.1 | 1.2 |
| Coercive force (Oe) | 1927 | 1969 |
| Br/Bm (–) | 0.86 | 0.87 |
| Gloss (%) | 203 | 211 |
| Ra (nm) | 18.6 | 15.3 |
| Young's modulus (–) (relative value) | 128 | 131 |
| Linear absorption coefficient (μm$^{-1}$) | 1.21 | 1.23 |
| Durability | | |
| Running durability (min) | 8.2 | 14.8 |
| Scratch resistance | C | C |

What is claimed is:

1. A magnetic recording medium comprising:

a non-magnetic substrate;

a non-magnetic undercoat layer formed on said non-magnetic substrate, said undercoat layer comprising non-magnetic acicular hematite particles containing 0.05 to 50% by weight of aluminum uniformly within the particles, calculated as Al, based on the total weight of the non-magnetic particles and a binder resin; and a magnetic recording layer formed on said non-magnetic undercoat layer, said magnetic recording layer comprising magnetic particles containing iron as a main ingredient, and a binder resin.

2. A magnetic recording medium according to claim 1, wherein said acicular hematite particles containing 0.05 to 50% by weight of aluminum, calculated as Al, have an average major axial diameter of not more than 0.3 μm, an average minor axial diameter of 0.0025 to 0.15 μm and an aspect ratio of not less than 2:1.

3. A magnetic recording medium according to claim 1, wherein said acicular hematite particles containing 0.05 to 50% by weight of aluminum, calculated as Al, have a BET specific surface area ($S_{BET}$) of not less than 35 m$^2$/g, a geometrical standard deviation of not more than 1.50, a resin adsorptivity of not less than 65%, and an $S_{BET}/S_{TEM}$ ratio of 0.5 to 2.5, wherein said $S_{TEM}$ is a value calculated from the major axial diameter and the minor axial diameter of said particles which were measured from said particles in an electron micrograph.

4. A magnetic recording medium according to claim 1, wherein said acicular hematite particles containing 0.05 to 50% by weight of aluminum, calculated as Al, have a coating comprising at least one selected from the group consisting of a hydroxide of aluminum, an oxide of aluminum, a hydroxide of silicon and an oxide of silicon, which is coated on the surfaces of said acicular hematite particles.

5. A magnetic recording medium according to claim 1, wherein said magnetic particles containing iron as a main ingredient contain 0.05 to 10% by weight of aluminum, calculated as Al, based on the total weight of the magnetic particles.

6. A magnetic recording medium according to claim 1, wherein said magnetic particles containing iron as a main ingredient comprise 50 to 99 wt % of iron based on the total weight of the magnetic particles, 0.05 to 10% by weight of aluminum, calculated as Al, based on the total weight of the magnetic particles and at least one selected from the group consisting of Co, Ni, P, Si, Zn, Ti, Cu, B, Nd, La and Y.

7. A magnetic recording medium according to claim 1, wherein said magnetic particles containing iron as a main ingredient comprise 50 to 99% by weight of iron, 0.05 to 10% by weight of aluminum, and at least one rare earth metal selected from the group consisting of Nd, La and Y.

8. A magnetic recording medium according to claim 1, wherein said magnetic particles containing iron as a main ingredient have an average major axial diameter of 0.01 to 0.50 μm, an average minor axial diameter of 0.0007 to 0.17 μm, an aspect ratio of not less than 3:1.

9. A magnetic recording medium according to claim 1, which further have a coercive force of 900 to 3500 Oe, a squareness of 0.85 to 0.95, a gloss of 180 to 300%, a surface roughness of not more than 14.0 nm, and a linear adsorption coefficient of 1.10 to 2.00 μm$^{-1}$.

* * * * *